(12) United States Patent
Sun et al.

(10) Patent No.: US 8,898,478 B2
(45) Date of Patent: Nov. 25, 2014

(54) METHOD FOR QUERYING DATA IN PRIVACY PRESERVING MANNER USING ATTRIBUTES

(75) Inventors: Wei Sun, Kitchener (CA); Shantanu Rane, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 239 days.

(21) Appl. No.: 13/525,191

(22) Filed: Jun. 15, 2012

(65) Prior Publication Data

US 2013/0339751 A1   Dec. 19, 2013

(51) Int. Cl.
  G06F 11/30  (2006.01)
  G06F 12/14  (2006.01)
  H04L 9/00   (2006.01)
  G06F 21/60  (2013.01)

(52) U.S. Cl.
  CPC .............. *G06F 21/602* (2013.01); *H04L 9/00* (2013.01)
  USPC ........................................................ 713/189

(58) Field of Classification Search
  CPC ................................ G06F 21/602; H04L 9/00
  USPC ....................................................... 713/189
  See application file for complete search history.

(56) References Cited

U.S. PATENT DOCUMENTS

| | | | |
|---|---|---|---|
| 7,634,085 B1 * | 12/2009 | Sahai et al. ...................... 380/28 |
| 2011/0131222 A1 * | 6/2011 | DiCrescenzo ................ 707/757 |
| 2012/0039473 A1 * | 2/2012 | Gentry et al. ................. 380/277 |
| 2012/0300936 A1 * | 11/2012 | Green .......................... 380/278 |
| 2013/0318360 A1 * | 11/2013 | Yamamoto et al. ........... 713/189 |

OTHER PUBLICATIONS

Iris Biometric Cryptography for Identity Document 2009 International Conference of Soft Computing and Pattern Recognition pp. 736-741.*
Evaluating 2-DNF Formulas on Ciphertexts., Dan Boneh, Eu-Jin Goh, Kobbi Nissim Theory of Cryptography: Second Theory of Cryptography Conference, TCC 2005, Cambridge, MA, USA, Feb. 10-12, 2005, Proceedings, pp. 325-341.*

* cited by examiner

*Primary Examiner* — Kambiz Zand
*Assistant Examiner* — Benjamin Kaplan
(74) *Attorney, Agent, or Firm* — Dirk Brinkman; Gene Vinokur (57) ABSTRACT

A client queries a set of encrypted data instances located at a server with a query attribute of the client. The set of encrypted data instances is associated with a set of ciphertexts, wherein a ciphertext is an encrypted function of a representation of a corresponding data instance and a data instance attribute extracted from the corresponding data instance. The client decrypts the ciphertext from the set of ciphertexts based on a distance function of the query attribute and the data instance attribute to produce the representation, and accesses the corresponding data instance using the representation.

15 Claims, 4 Drawing Sheets

METHOD FOR QUERYING DATA IN PRIVACY PRESERVING MANNER USING ATTRIBUTES

FIELD OF THE INVENTION

The invention relates generally to differential data privacy, and more particularly to privacy preserving querying of a set of encrypted data instances with a query attribute.

BACKGROUND OF THE INVENTION

Computations and Comparisons on Privately Held Data

Secure comparison of two data instances, such as images, videos, sounds, texts, without revealing the data instances is part of secure multiparty computation. If a function of two data instances can be expressed as an algebraic circuit, then there usually exists a generalized protocol to compute the function while satisfying various privacy requirements. In practice, however, such a generalized protocol is extremely complex in terms of computation and communication overhead. Therefore, it is necessary to develop efficient protocols for commonly used functions, such as a Euclidean distance, a Hamming distance, or a cross-correlation.

Homomorphic Cryptosystems

A number of methods use public-key homomorphic cryptosystems for computing functions in an encrypted domain. The homomorphic cryptosystems can be classified as additively, multiplicatively, or doubly homomorphic cryptosystems. Such cryptosystems have been used to construct privacy preserving protocols for comparing strings, clustering nearest-neighbors, recognizing faces, authenticating biometric data, and other applications.

Most of those methods require encryption of the data using a public encryption key of a client performing a query, and operate in two stages: (1) secure computation of the distance or correlation between data instances; and (2) information retrieval based on a distance criterion. While those methods can be efficient for a single query, the methods may not scale for multiple clients simultaneously querying a database stored at a server. For example, if several clients retrieve similar images from the server, the entire protocol is replicated using the encryption/decryption key pair of each client. For several concurrent queries, a large amount of ciphertext is produced, which is discarded later.

Accordingly, it is desired to encrypt the data on the server only once, such that the data can be retrieved by various clients in a privacy preserving manner.

Attribute-Based Encryption (ABE)

In a conventional cryptosystem, when the server needs to transmit a data instance securely to the client, the server must encrypt the data instance either with a symmetric key known to server and the client, or with a public key of the client. Instead, in the ABE system, the server obtains some public encryption parameters from a key authority (KA) and generates a ciphertext that includes two components: the encryption of the data instance and a data instance attribute extracted from the data instance.

In order to perform decryption, the client uses its attribute to request a decryption key from the KA. For example, the client can decrypt the data instance if and only if a dot product of the attributes of the client and the server is zero, see Katz et al., Predicate Encryption Supporting Disjunction, Polynomial Equations, & Inner Products," in EUROCRYPT, Istanbul, Turkey, pp. 146-162, April 2008.

However, the above method has a number of practical limitations. First, the construction based on the dot product cannot directly be used to compare two data instances, with respect to a distance metric such as the Hamming distance, the Euclidean distance, etc. Second, the construction requires the KA, which can be disadvantageous in a number of applications, because the KA issues client-specific or server-specific decryption keys and thus has full knowledge of both keys. A trusted (non-malicious) KA with such significant powers can be difficult to replicate in practice.

Bilinear Groups of Composite Order

An example of bilinear groups of composite order, is when the group order N is a product of three primes. Let N=pqr, where p, q, r are three different prime numbers. Let G and $G_T$ be cyclic groups of order N. Then, a mapping e:G×G→$G_T$ is a non-degenerate bilinear map if the mapping satisfies e($x^\alpha$, $y^\beta$)=e(x,y)$^{\alpha\beta}$ where x, y are elements of G and $\alpha$, $\beta$ are integers. Further, if g is a generator of G, then e(g, g) is a generator of $G_T$.

Consider the cyclic groups $G_p$, $G_q$ and $G_r$ with orders p, q and r respectively and generators $g_p$, $g_q$ and $g_r$ respectively. Then G=$G_p \times G_q \times G_r$ and any element x in the set G can be represented as x=$g_p^\alpha g_q^\beta g_r^\gamma$, where $\alpha$, $\beta$, $\gamma$ are integers.

The bilinear map e(·,·) has the following properties:

$$e(g_p^\alpha, g_q^\beta)=1$$

$$e(g_p^\alpha g_q^\beta, g_q^\beta)=e(g_q^\delta, g_q^\beta),$$

$$e(g_p^\alpha, g_p^\beta g_p^\delta)=e(g_p^\alpha, g_p^\beta)\cdot e(g_p^\alpha, g_p^\delta), \text{ and}$$

$$e(g_p^\alpha g_q^\beta, g_p^\gamma g_q^\delta)=e(g_p^\alpha, g_p^\gamma)\cdot e(g_q^\beta, g_q^\delta).$$

Proving these properties involves an application of the definition of the bilinear mapping given above, and the properties of multiplicative cyclic groups.

Mathematically Intractable Problems

The security of the attribute-based cryptosystems using bilinear groups of composite order reduces to solving two problems, described below, that are regarded as computationally intractable. Consider an integer N=pqr for large primes p, q, r and a cyclic group G=$G_p \times G_q \times G_r$.

Then, the following problems are thought to be mathematically intractable:

1. Subgroup Decision Problem: It is computationally hard to distinguish elements of the subgroup $G_p \times G_q$ from an element of the group G. In other words, it is computationally hard to determine whether an element is drawn from a uniform distribution on G, or from a uniform distribution on the subgroup $G_p \times G_q$.

2. Pairing Diffie-Hellman Problem: Consider a bilinear map e:G×G→$G_T$. Choose $\bar{g}$ as one element from the set $$\bigsqcup_{SEP}^{L} \{g_p, g_q, g_r\}.$$

Suppose that e($\bar{g},\bar{g}$)$^v$ is given and an integer $$\bigsqcup_{SEP}^{L} u$$

is chosen at random. Then, it is computationally hard to distinguish e($\bar{g}, \bar{g}$)$^{uv}$, an element of $G_T$ from a randomly chosen element of $G_T$. Another way of stating this is that, given e($\bar{g},\bar{g}$)$^v$, it is computationally hard to obtain v.

Both these assumptions are related to the computational intractability of finding non-trivial prime factors of a large number N. A detailed discussion of proving the security of an ABE system based on bilinear groups of composite order, see Katz et al.

SUMMARY OF THE INVENTION

It is an objective of some embodiments of the invention to provide a system and a method for privacy-preserving querying a set of encrypted data instances with a query attribute of a client. For example, some embodiments are used by applications in which data are stored once at a server, and the same data are queried by multiple clients.

It is another objective to provide such a method, in which encryption of data instances can be performed only once for various clients, and the set of encrypted data instances is associated with a set of ciphertexts, such that the decryption of the ciphertext can be performed based on a distance function of a query attribute and a data instance attribute, and the successful decryption can produce a representation suitable for accessing the corresponding data instance.

It is further objective of some embodiments, to provide such a method that can be implemented without a key authority.

Some embodiments of the invention are based on a realization that the ciphertext can be constructed such that the ciphertext can be decrypted based on a distance function of the query and the data instance attributes. For example, the decrypting of the ciphertext can include determining a product of representation of the data instance with an expression that evaluates to one when the distance function corresponds to a specific value bound by a threshold.

Accordingly, one embodiments discloses a method for privacy-preserving querying a set of encrypted data instances located at a server with a query attribute of a client, wherein the set of encrypted data instances is associated with a set of ciphertexts, wherein a ciphertext is an encrypted function of a representation of a corresponding data instance and a data instance attribute extracted from the corresponding data instance. The method includes decrypting the ciphertext from the set of ciphertexts based on a distance function of the query attribute and the data instance attribute to produce the representation; and accessing the corresponding data instance using the representation. Steps of the method are performed by a processor of the client.

Another embodiment discloses a method for privacy-preserving querying a set of encrypted data instances with a query attribute, wherein the set of encrypted data instances is associated with a set of ciphertexts, wherein a ciphertext is an encrypted function of a representation of a corresponding data instance and a data instance attribute extracted from the corresponding data instance, and wherein the querying is based on a distance function of the query attribute and the data instance attribute. The method includes receiving, in response to transmitting a masked query attribute, a pre-decryption key including elements of multiplicative groups wherein a number of the elements and a mathematical form of the elements correspond to a polynomial structure of the distance function and the masked query attribute; determining a decryption key based on the pre-decryption key and the masked query attribute; determining, using the decryption key, a product of the representation with an expression that evaluates to one when a result the distance function corresponds to a value bound by a threshold; and accessing the corresponding data instance using the representation. Steps of the method are performed by a processor.

Yet another embodiment discloses a system for privacy-preserving querying a set of encrypted data instances with a query attribute, wherein the set of encrypted data instances is associated with a set of ciphertexts, wherein a ciphertext is an encrypted function of a representation of a corresponding data instance and a data instance attribute extracted from the corresponding data instance. The system includes a processor for decrypting the ciphertext from the set of ciphertexts based on a distance function of the query attribute and the data instance attribute to produce the representation, wherein the decrypting is successful if and only if a result of the distance function is less than a threshold.

DETAILED DESCRIPTION OF THE PREFERRED EMBODIMENT

The execution of various steps of the method for a privacy-preserving querying and data retrieval application can be roughly partitioned into three stages: (1) generating encrypted content; (2) storing encrypted content; and (3) retrieving. These stages are described for clarification and overview purposes only. Various embodiments of the invention perform steps of some, all or none of those stages. For example, stages (1) and (2) can be performed once, usually by a server, when data becomes available for storage. Stage (3) can be performed when a client retrieves data under privacy constraints. In some embodiments described herein, the data instances stored at the server are images. However other embodiments work with other kinds of data that can be stored in a digital format, e.g., videos, speech, music, numerical datasets, text, etc.

Generation of Encrypted Content

Figure 1:
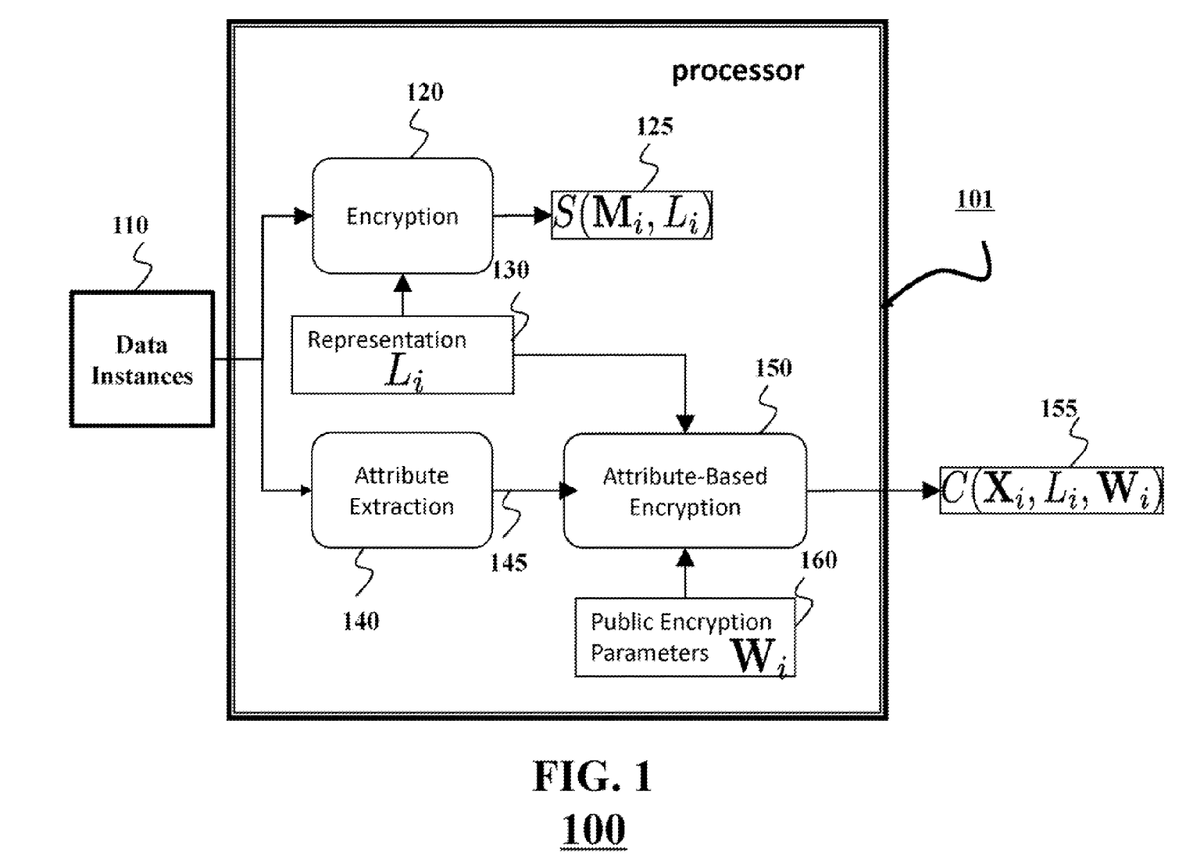
FIG. 1 is a block diagram of a method for generating encrypted data according to some embodiments of invention.

FIG. 1 shows a block diagram of a method 100 for generating encrypted data for the privacy-preserving querying and data retrieval application. The method 100 can be performed only once, and performed by, e.g., a processor 101 of the server. Let $M^{(i)}$, where i belongs to the set $\{1, 2, \ldots, m\}$ represent the data instances 110 to be included in the database. For each i, the server generates a representation 130 $L_i$ of the data instance. For example, the representation 130 can be a secret key of a symmetric encryption scheme applied to the data instance, or any other representation of the data instance including the data instance itself.

The representation can be used for accessing the corresponding data instance. In one embodiment, the representation is a secret key used to encrypt 120 the data instance to produce an encrypted data instance $S(M^{(i)}, L_i)$ 125. Knowing the representation, the client can decrypt the encrypted data instance to access the data instance in the unencrypted domain.

Some embodiments recognized that having the representation as the secret key of the symmetric cryptosystem can optimize data storage requirements on the server. This is because the public key encryption significantly increases the size of the ciphertext, and thus causes a corresponding increase in storage, computation and communication overhead. Therefore, some embodiments use public key encryption only for the (preferably low-dimensional) attributes. Some embodiments evaluate the querying criteria based only on the attributes, and if these criteria are satisfied, the encrypted data instance $M^{(j)}$ is transferred to the client. The symmetric encryption of the data instance, $S(M^{(j)}, L_j)$ is efficient in terms of storage and computation overhead and minimize ciphertext expansion.

Also, the server extracts 140 from each data instance, such as image $M^{(i)}$, a data instance attribute $x^{(i)}$ of the corresponding data instance. The data instance attribute can be any vector or other data extracted from the image, such as an image digest, a feature vector, a hash, a locality-sensitive hash, an image fingerprint, or the vectorized image matrix $M^{(i)}$ itself. Then, the server generates 160 encryption parameters W, which can be public, and determines 150 a ciphertext $C(x^{(i)}, L^i, w)$ 155, which hides the data instance attribute $x^{(i)}$, and the representation $L_i$, e.g., the symmetric key used to encrypt the image $M^{(i)}$.

Storage of Encrypted Content

Figure 2:
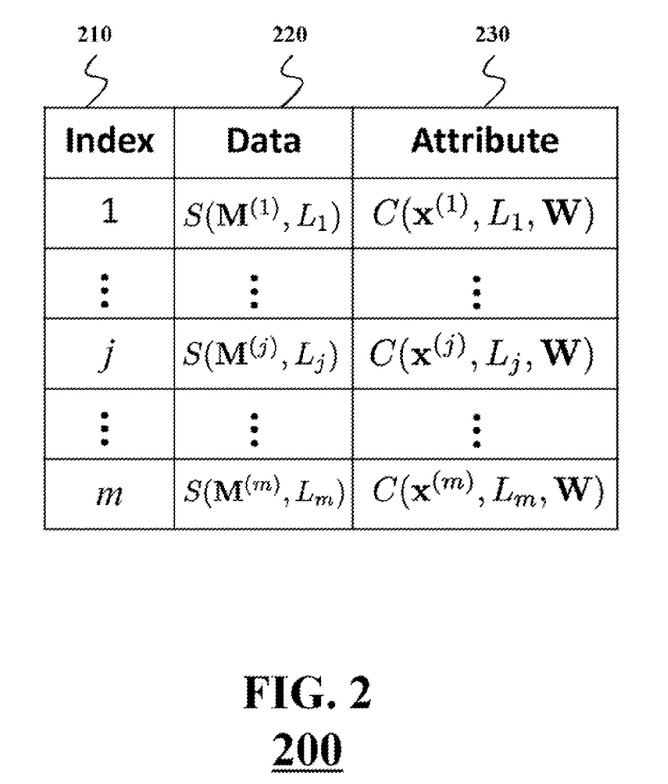
FIG. 2 is an example of a portion of a database for storing the encrypted data corresponding to the data instances according to some embodiments of the invention.

FIG. 2 shows an example of a portion of a database 200 in tabular form for storing the encrypted content corresponding to the data instances $M^{(i)}$. For example, the database 200 includes a set of encrypted data instances 220 and a set of ciphertexts 230. The set of encrypted data instances is associated with the set of ciphertexts, e.g., via indexes 210. The ciphertext is an encrypted function of a representation of a corresponding data instance and a data instance attribute extracted from the corresponding data instance.

To retrieve any data instance 220 $M^{(j)}$, with index 210 $j \in \{1, 2, \ldots, m\}$, the client needs to obtain the corresponding representation $L_j$ hidden in the ciphertext 230 $C(x^{(j)}, L_j, w)$. For a computationally bounded adversary, all usable information about the data instance $M^{(j)}$ and its attribute $x^{(j)}$ are hidden in the $S(M^{(j)}, L_j)$ and $C(x^{(j)}, L_j, w)$, respectively.

Retrieval of Encrypted Content

Figure 3:
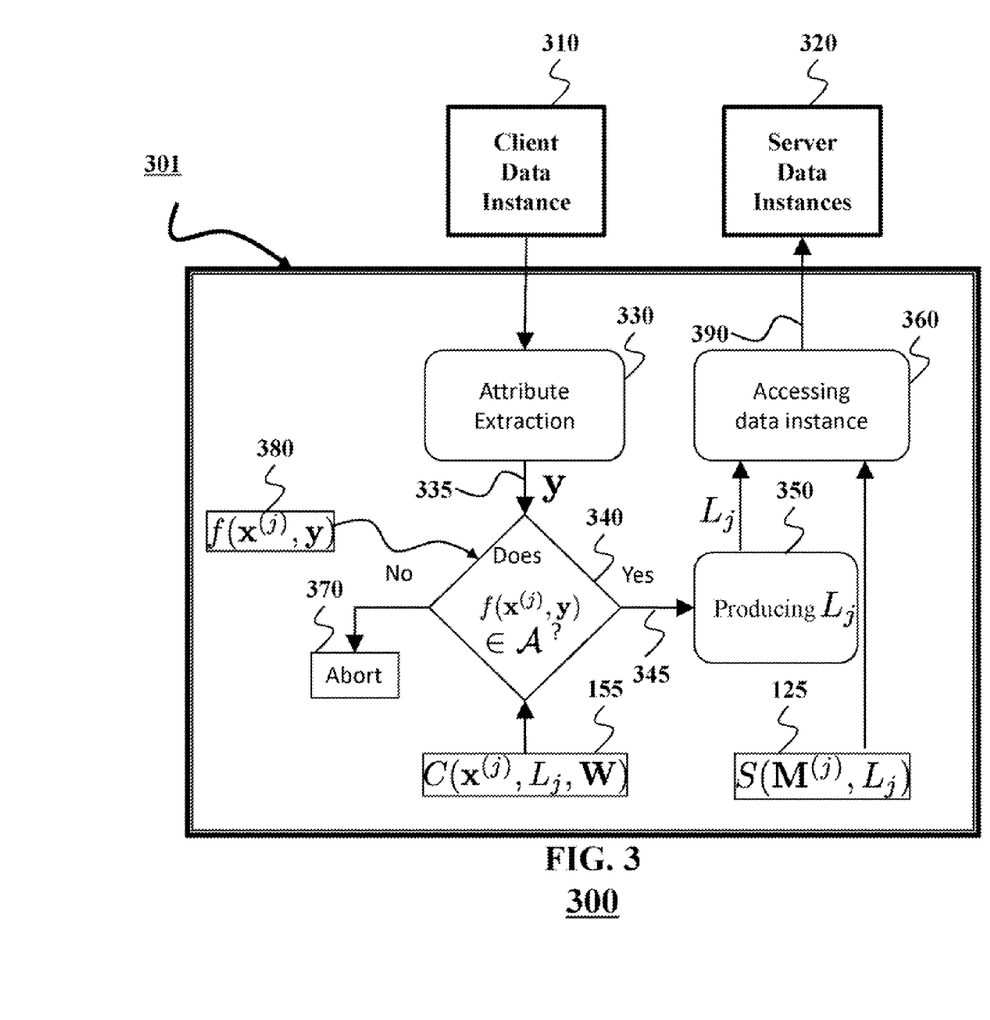
FIG. 3 is a diagram of a method for querying the database of FIG. 2 according to some embodiments of the invention.

FIG. 3 shows a method 300 for querying and data retrieval according to some embodiments of the invention. The method can be performed by, e.g., a processor 301 at the client. Suppose that a client has a query data instance Q 310 from which the client has extracted 330 an attribute vector y 335. In one embodiment, the attribute extraction methods used by the client and the server are identical. However, in other embodiments, this is not a requirement.

In various embodiments, the client produces 350 the representation by decrypting 340 the ciphertext based on a distance function 380 of the query attribute and the data instance attribute to produce the representation. If the representation is a secret key used to encrypt the data instance, than the client can decrypt the encrypted data instance using that key. The application of the distance function can ensure that the client retrieves the data instance from the server if and only if the query attribute y of the client satisfies 345 a specific mathematical condition with respect to the data instance attribute $x^{(j)}$ of the corresponding data instance.

In one embodiment the specific mathematical condition is that a result of the distance function is less than a threshold. Otherwise, the decryption fails 370. Therefore, in some embodiments, the ciphertext $C(x^{(j)}, L_j, w)$ is designed such that the ciphertext can be decrypted by the client only if the distance function $f(x^{(j)}, y)$ 340 takes a value in a permissible set A.

The distance function can be any polynomial expression in elements of the query attribute and the data instance attribute. As known in the art, the polynomial expression can be a sum of monomials, e.g., in a form of $\alpha_{KL} x^K y^L$, wherein $\alpha$, K, L are parameters of the monomials. In some embodiments, the distance function is a Euclidean distance or a Hamming distance function.

In some embodiments, to ensure privacy of the database entries, the condition that $f(X^{(j)}, y)$ belongs to the set A is checked without revealing the attribute $X^{(j)}$. For example, after the representation $L_j$ is produced, the client can access 360 an encrypted data instance 320 of the server. For example, the client can retrieve 390 the encrypted data instance $S(M^{(j)}, L_j)$ from the server by means of oblivious transfer (OT), and obtain the data instance $M^{(j)}$ using the representation, e.g., the secret key. By construction, the client does not discover any other data instances in the database 200, while OT ensures that the server does not discover the index of the retrieved data instance. Other modes of data instance retrieval are possible.

Exemplar Embodiment

Figure 4:
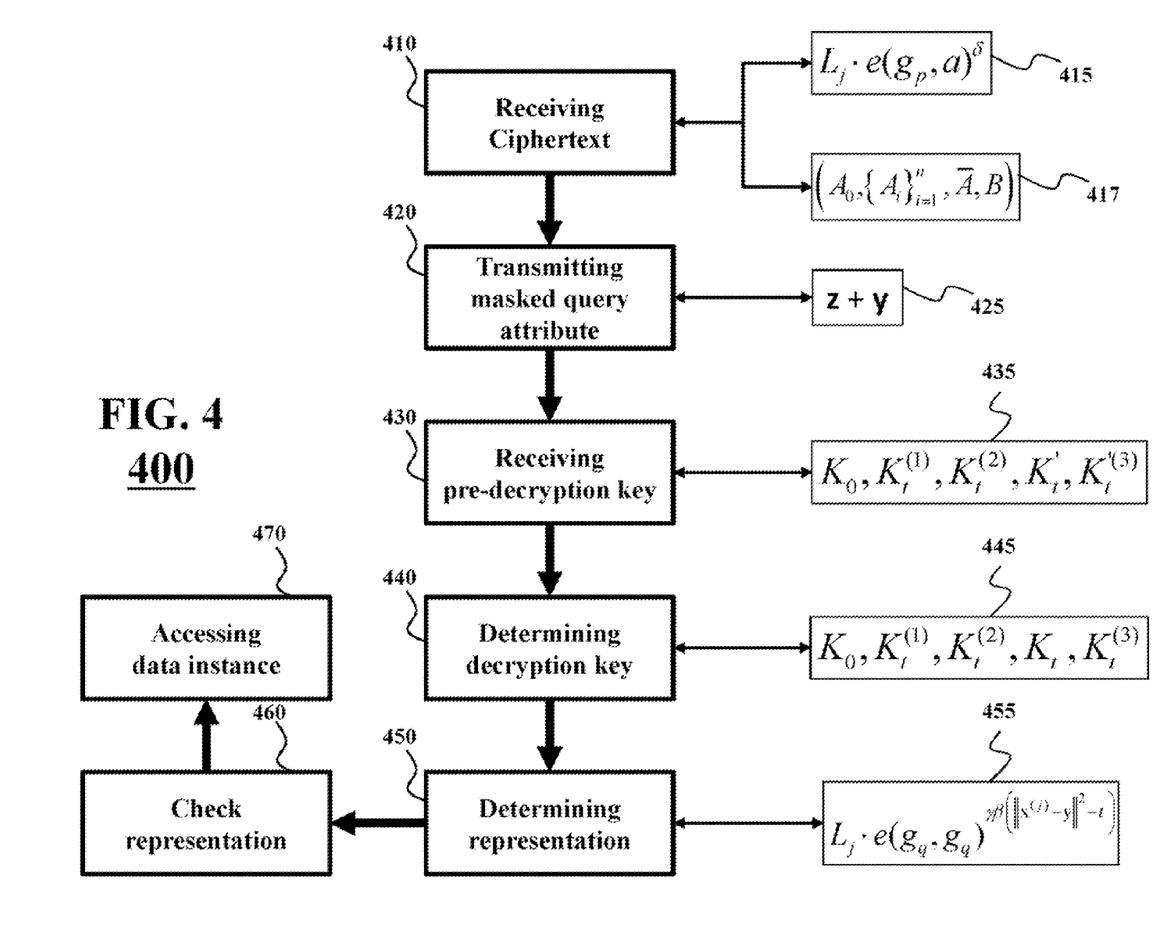
FIG. 4 is a diagram of a method for privacy-preserving querying a set of encrypted data instances located at a server with a query attribute of a client, according to some embodiments of the invention.

FIG. 4 shows a method 400 for privacy-preserving querying a set of encrypted data instances located at a server with a query attribute of a client, according to some embodiments of the invention. The set of encrypted data instances is associated with a set of ciphertexts, wherein a ciphertext is an encrypted function of a representation of a corresponding data instance and a data instance attribute extracted from the corresponding data instance.

The ciphertext $C(x^{(j)}, L_j, w)$ is designed to be decrypted by the client only if a distance function $f(x^{(j)}, y)$ takes a value in a permissible set A. In one example, the distance function $f$ is the squared Euclidean distance, i.e.

$$f(x^{(j)}, y) = \|x^{(j)} - y\|^2 = \sum_{i=1}^{n} \left(x_i^{(j)} - y_i\right)^2$$

The client attempts to retrieve the data instance from the database at the server. In this example, the set of data instances $M^{(j)}$ is encrypted using a symmetric cryptosystem. The corresponding data instance attributes $X^{(j)}$ are hidden in ciphertexts along with their representations, e.g., secret keys $L_j$, using an attribute-based cryptosystem. To retrieve $M^{(j)}$, it is sufficient for the client to discover the secret key $L_j$ of the symmetric cryptosystem.

Some embodiments uses an attribute-based cryptosystem, which ensures that the client discovers $L_j$ only if the squared Euclidean distance between the attributes $x^{(j)}, j \in \{1, 2, \ldots, m\}$ stored at the server and attributes y of the client is less than a threshold $\tau$.

The exemplar embodiments described below are advantageous in at least two aspects. First, the function computed is not the dot product between the attributes, but a distance function between attributes. Those embodiments ensures retrieval of the data instance when the attributes are different, which is important for a number of applications.

Second, all calculations including generation of the encryption and decryption keys are only performed by two parties, i.e., the server generating the encrypted content, and the client attempting to retrieve a subset of the encrypted content. Thus, the need for the KA is avoided, making the embodiments practical in applications where the KA is not feasible.

Setup Phase

The server generates large primes p, q, r, and two cyclic groups G and $G_T$ of order N=pqr. As described above, there are cyclic groups $G_p$, $G_q$ and $G_r$ with orders p, q and r respectively and generators $g_p$, $g_q$ and $g_r$ respectively. Let e:G× G→$G_T$ be a non-degenerate bilinear map. There exist procedures based on elliptic curves to generate multiplicative cyclic groups of composite order, and non-degenerate bilinear mappings using these groups. Examples include the Weil pairing and Tate pairing.

The server randomly selects a as an element of $G_p$ and c as an element of $G_r$, and outputs public parameters w=(N, $g_p$, $g_r$, $g_q$c, e($g_p$, a)), and retains a private key (p, q, r, $g_q$, a, c). The client and server agree on a distance threshold τ.

Encryption

For every index j belonging to the set {1, 2, . . . , m}, the server possesses a data instance attribute $x^{(j)} = (x_1^{(j)}, x_2^{(j)}, \ldots, x_n^{(j)})$ to be hidden in the ciphertext. The server randomly selects δ, γ from the set of integers Z and $s_i$ from the set $G_r$, i=0, 1, 2, . . . , n and determines the ciphertext to be received 410 by the client. In various embodiments, the ciphertext includes a product 415 of the representation with a bilinear mapping on multiplicative cyclic groups of composite order. In some embodiments, the ciphertext further includes elements 417 of multiplicative cyclic groups of composite order.

For example, in one embodiment, the ciphertext is $$C(x^{(j)}, L_j, W) = (A_0, \{A_i\}_{i=1}^n, \overline{A}, B, H_j),$$

wherein $$A_0 = (g_q c)^\gamma,$$

$$A_i = (g_q c)^{\gamma x_i^{(j)}} s_i,$$

$$\overline{A} = s_0 (g_q c)^{\gamma \sum_{i=1}^n (x_i^{(j)})^2},$$

$$B = g_p^\delta, H_j = L_j \cdot e(g_p, a)^\delta.$$

In one embodiment, the elements of the multiplicative groups, i.e., $A_0, A_i, \overline{A}$, and B are selected based on the number and the form of the elements of the squared Euclidean distance function for convenience of the decryption. The parameters $S_i$, δ and γ can be selected randomly and can be different for each encryption. These parameters are not needed by the decrypting party, i.e., the client and the server to ensure that the ciphertext generated from repeated encryptions of the same method is different every time, i.e., the ciphertext is semantically secure.

Decryption Key Generation

The client determines a decryption key based on a query attribute, $y=(y_1, y_2, \ldots, y_n)$ extracted from the query data instance Q 310. However, to prevent the server from finding out any information about Q, some embodiments hide both y and the decryption key from the server.

For example, in one embodiment, the client randomly selects a vector $z=(z_1, z_2, \ldots, z_n)$ and transmit 420 a masked query attribute z+y 425 and $$\sum_{i=1}^n z_i$$

to the server. The server randomly selects integers α, β, $α_i$, i=1, 2, . . . , n and $σ_t$, $ρ_t$, t=0, 1, . . . , τ, and generates a pre-decryption key 435 to be received 430 by the client.

In one embodiment, this pre-decryption key includes $$K_0 = g_p^\alpha g_q^\beta,$$

$$K_t^{(1)} = a^{-1} g_p^{\alpha - \rho_t - 2\sum_{i=1}^n \alpha_i + 2\alpha \sum_{i=1}^n z_i},$$

$$t = 0, 1, \ldots, \tau,$$

$$K_t^{(2)} = g_p^{\rho_t} g_q^{\beta \sigma_t},$$

$$t = 0, 1, \ldots, \tau,$$

$$K_i' = g_p^{\alpha_i} g_q^{\beta(y_i + z_i)},$$

$$i = 1, 2, \ldots, n,$$

and $$K_t'^{(3)} = g_p^\alpha g_q^{\beta(\sum_{i=1}^n (y_i + z_i)^2 - t - \sigma_t)},$$

$$t = 0, 1, \ldots, \tau.$$

Using the pre-decryption key and knowledge of y and z, the client determines 440 the decryption key 445, given by $K_0$, $K_t^{(1)}$, $K_t^{(2)}$ and the following relations:

$$K_i = K_i' K_0^{-z_i},$$

$$i = 1, 2, \ldots, n,$$

$$K_t^{(3)} = K_t'^{(3)} K_0^{-\sum_{i=1}^n (z_i^2 + 2z_i y_i)},$$

$$t = 0, 1, \ldots, \tau.$$

Decryption

Using the query attribute y, the client evaluates the following expression $$D = H_j \cdot e(B, K_t^{(1)}) \cdot e(A_0, K_t^{(3)}) \cdot$$
$$e(A_0 B, K_t^{(2)}) \cdot (e(\overline{A} B, K_0))^{-1} \cdot \left( \prod_{i=1}^n e(A_i B, K_i) \right)^2$$

for each t=0, 1, . . . τ for each j belonging to the set {1, 2, . . . , m}. By repeatedly applying the four properties of the bilinear map provided above, the above expression can be simplified to $$D = L_j \cdot e(g_q, g_q)^{\gamma \beta (\|x^{(j)} - y\|^2 - t)}.$$

Accordingly, the client can determine 450 a product 455 of the representation with an expression that evaluates to one when the distance function corresponds to a specific value less than a threshold.

Thus, the secret key, $L_j$ is revealed to the client only if the squared Euclidean distance between $X^{(j)}$ and y equals t. Otherwise, the result of evaluating the right hand side of the above equation returns an element of the set $G_T$. Because the client does not discover $x^{(j)}$ at any stage, some embodiments check the representation 460 to determine that the client has actually decrypted $L_j$. For example, one embodiment left-shift the digits of $L_j$, and append a publicly known pattern of digits.

For example, if the true representation $L_j$ is "7984", then the server encrypts 798429742, where the last 5 digits are predetermined and used to verify correct decryption. Because the ciphertext field is so large, it is extremely unlikely that the client's calculation of the squared Euclidean distance returns a value with a chosen 5-digit pattern even when $\|x^{(j)}-y\|^2 \neq t$. If the client discovers the public embedded pattern in the digits of the right hand side of the above expression, then the decryption is successful for some $t \leq \tau$. Thus, the client can remove the embedded pattern to recover the actual $L_j$ and can access 470 the data instance. If the client does not discover the embedded pattern for any t in the range $[0, \tau]$, then decryption is deemed unsuccessful based on the squared Euclidean distance criterion.

The above-described embodiments of the invention can be implemented in any of numerous ways. For example, the embodiments may be implemented using hardware, software or a combination thereof. When implemented in software, the software code can be performed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is performed on a framework or virtual machine.

In this respect, the invention may be embodied as a computer readable storage medium or multiple computer readable media, e.g., a computer memory, compact discs (CD), optical discs, digital video disks (DVD), magnetic tapes, and flash memories. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, performed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for privacy-preserving querying of a set of encrypted data instances located at a server with a query attribute of a client, wherein the set of encrypted data instances is associated with a set of ciphertexts, wherein a ciphertext is an encrypted function of a representation of a corresponding data instance and a data instance attribute extracted from the corresponding data instance, comprising:

decrypting the ciphertext from the set of ciphertexts based on a distance function of the query attribute and the data instance attribute to produce the representation, wherein the ciphertext is $$C(x^{(j)}, L_j, W) = (A_0, \{A_i\}_{i=1}^n, \overline{A}, B, H_j),$$

wherein $$A_0 = (g_q c)^\gamma,$$

$$A_i = (g_q c)^{\gamma x_i^{(j)}} s_i,$$

$$\overline{A} = s_0 (g_q c)^\gamma \sum_{i=1}^n (x_i^{(j)})^2,$$

$B = g_p^\delta$, $H_j = L_j \cdot e(g_p, \alpha)^\delta$, wherein p, q, r are primes of cyclic groups G and $G_T$ of order N=pqr, $G_p$, $G_q$ and $G_r$ are cyclic groups with orders p, q and r respectively with generators $g_p$, $g_q$ and $g_r$ respectively, $e: G \times G \to G_T$ is a non-degenerate bilinear map, a belongs to $G_p$ and c belongs to $G_r$ are randomly chosen parameters, W=(N, $g_p$, $g_r$, $g_q c$, $e(g_p, \alpha)$), and the ciphertext is encrypted with a private master key (p, q, r, $g_q$, $\alpha$, c); and accessing the corresponding data instance using the representation, wherein steps of the method are performed by a processor of the client.

2. The method of claim 1, wherein the ciphertext includes a product of the representation with a bilinear mapping on multiplicative cyclic groups of composite order.

3. The method of claim 2, wherein the ciphertext further includes elements of multiplicative groups, wherein a number of the elements and a mathematical form of the elements correspond to a polynomial structure of the distance function.

4. The method of claim 3, further comprising:
transmitting a masked query attribute to the server:
receiving from the server a pre-decryption key including the elements of multiplicative groups wherein a number of the elements and a mathematical form of the elements correspond to a polynomial structure of the distance function and the masked query attribute; and
determining a decryption key from the pre-decryption key, wherein the decryption key includes the elements of multiplicative groups wherein a number of the elements and a mathematical form of the elements correspond to a polynomial structure of the distance function and the query attribute.

5. The method of claim 1 wherein the decrypting comprises:
determining a product of the representation with an expression that evaluates to one when the distance function corresponds to a specific value less than a threshold.

6. The method of claim 5, wherein the expression comprises a bilinear mapping on multiplicative cyclic groups of composite order.

7. The method of claim 1, wherein the decrypting is successful if and only if a result of the distance function is less than a threshold.

8. The method of claim 1, wherein the distance function is a Euclidean distance function or a Hamming distance function.

9. The method of claim 1, wherein the distance function is a polynomial expression in elements of the query attribute and the data instance attribute, in a form of sum of monomials of $a_{KL}x^K y^L$.

10. The method of claim 1, wherein the representation is a secret key used to encrypt the corresponding data instance to produce an encrypted data instance, further comprising:
decrypting the encrypted data instance with the secret key.

11. A method for privacy-preserving querying a set of encrypted data instances with a query attribute, wherein the set of encrypted data instances is associated with a set of ciphertexts, wherein a ciphertext is an encrypted function of a representation of a corresponding data instance and a data instance attribute extracted from the corresponding data instance, and wherein the querying is based on a distance function of the query attribute, and the data instance attribute, wherein the ciphertext is $C(x^{(j)}, L_j, W) = (A_0, \{A_i\}_{i=1}^n, \overline{A}, B, H_j)$, wherein $$A_0 = (g_g c)^\gamma, A_i = (g_g c)^{\gamma x_i^{(j)}} s_i, \overline{A} = s_0 (g_q c)^{\gamma \sum_{i=1}^n (x_i^{(j)})^2},$$

$B = g_p^\delta$, $H_j = L_j \cdot e(g_p, \alpha)^\delta$, wherein p, q, r are primes of cyclic groups G and $G_T$ of order N=pqr, $G_p$, $G_q$ and $G_r$ are cyclic groups with orders p, q and r respectively with generators $g_p$, $g_q$ and $g_r$ respectively, e:G×G→$G_T$ is a non-degenerate bilinear map, α belongs to $G_p$ and c belongs to $G_r$ are randomly chosen parameters W=(N, $g_p$, $g_r$, $g_q c$, e($g_p$, α)), and the ciphertext is encrypted with a private master key (p, q, r, $g_q$, α, c), the method comprising:
receiving, in response to transmitting a masked query attribute a pre-decryption key including elements of multiplicative groups wherein a number of the elements and a mathematical form of the elements correspond to a polynomial structure of the distance function and the masked query attribute;
determining a decryption key based on the pre-decryption key and the masked query attribute;
determining, using the decryption key, a product of the representation with an expression that evaluates to one when a result the distance function corresponds to a value bound by a threshold; and
accessing the corresponding data instance using the representation, wherein steps of the method are performed by a processor.

12. The method of claim 11, further comprising
testing the product against a predetermined pattern of digits to produce the representation.

13. The method of claim 11, wherein the ciphertext includes a product of the representation with a bilinear mapping on multiplicative cyclic groups of composite order.

14. The method of claim 13, wherein the ciphertext further includes elements of multiplicative groups, wherein a number of the elements and a mathematical form of the elements correspond to a polynomial structure of the distance function.

15. A system for privacy-preserving querying a set of encrypted data instances with a query attribute, wherein the set of encrypted data instances is associated with a set of ciphertexts, wherein a ciphertext is an encrypted function of a representation of a corresponding data instance and a data instance attribute extracted from the corresponding data instance, comprising:
a processor for decrypting the ciphertext from the set of ciphertexts based on a distance function of the query attribute and the data instance attribute to produce the representation, wherein the decrypting is successful if and only if a result of the distance function is less than a threshold, wherein the ciphertext is
$C(x^{(j)}, L_j, W) = (A_0, \{A_i\}_{i=1}^n, \overline{A}, B, H_j)$, wherein $$A_0 = (g_g c)^\gamma, A_i = (g_g c)^{\gamma x_i^{(j)}} s_i, \overline{A} = s_0 (g_q c)^{\gamma \sum_{i=1}^n (x_i^{(j)})^2},$$

$B = g_p^\delta$, $H_j = L_j \cdot e(g_p, \alpha)^\delta$, wherein p, q, r are primes of cyclic groups C and $G_r$ of order N=pqr, $G_p$, $G_q$ and $G_r$ are cyclic groups with orders p, q and r respectively with generators $g_p$, $g_q$ and $g_r$ respectively, e: G×G→$G_T$ is a non-degenerate bilinear man, a belongs to $G_p$ and c belongs to $G_r$ are randomly chosen parameters, W=(N, $g_p$, $g_r$, $g_q c$, e($g_p$, α)), and the ciphertext is encrypted with a private master key (p, q, r, $g_p$, α, c).

* * * * *